T. & J. Churchill,
Making Baskets
Nº 45,585.   Patented Dec. 27, 1864.

Witnesses:
Wm. F. McNamara
J. P. Hall

Inventors:
Thomas Churchill
Jehiel Churchill
per Munn & Co
attorneys

UNITED STATES PATENT OFFICE.

THOMAS CHURCHILL AND JEHIEL CHURCHILL, OF DETROIT, MICHIGAN.

IMPROVEMENT IN MACHINES FOR FORMING BASKETS.

Specification forming part of Letters Patent No. 45,585, dated December 27, 1864.

*To all whom it may concern:*

Be it known that we, THOMAS CHURCHILL and JEHIEL CHURCHILL, of Detroit, in the county of Wayne and State of Michigan, have invented a new and Improved Machine for Making Baskets; and we do hereby declare that the following is a full, clear, and exact description thereof, which will enable those skilled in the art to make and use the same, reference being had to the accompanying drawings, forming part of this specification, in which—

Figure 1:
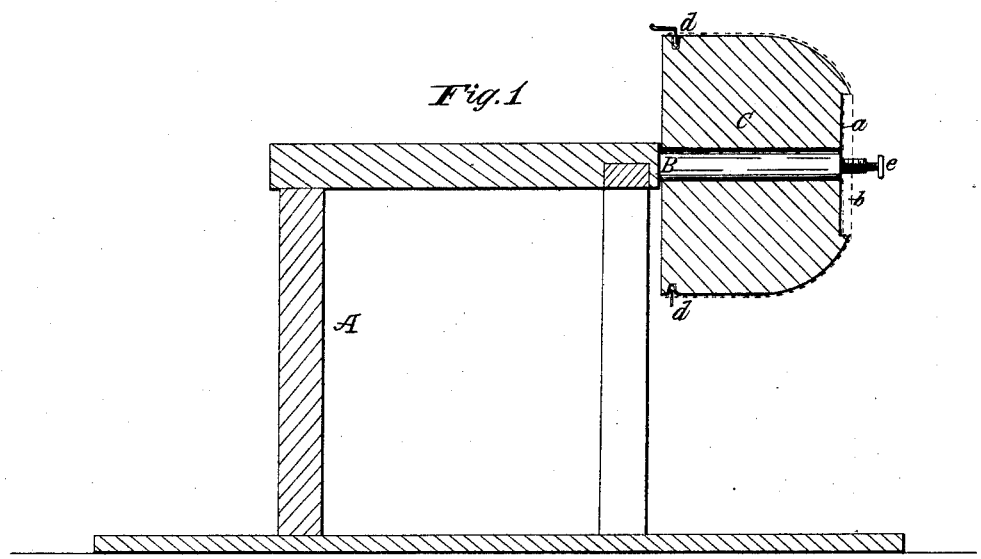
Figure 2:
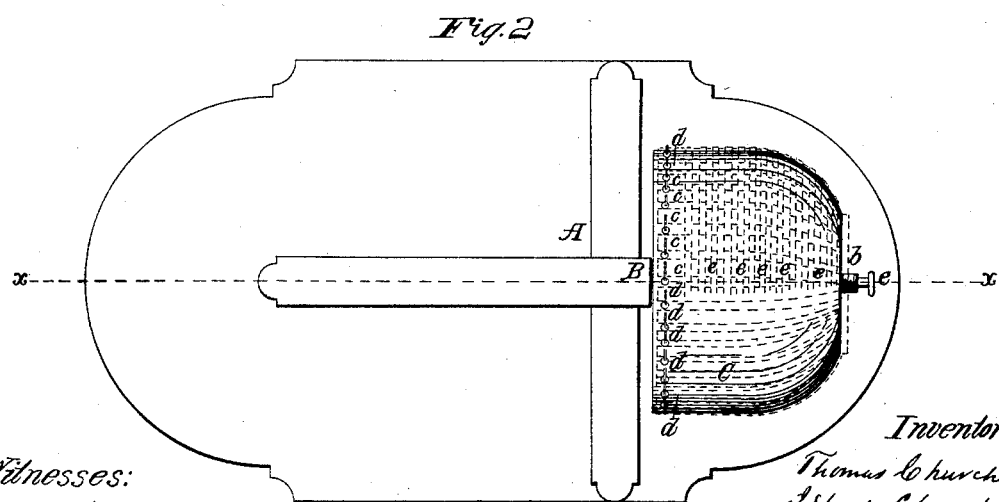

Figure 1 is a side sectional view of our invention, taken in the line $x\ x$, Fig. 2; Fig. 2, a plan or top view of the same.

Similar letters of reference indicate corresponding parts.

This invention consists in the employment or use of a form or block made in the shape corresponding to that designed for the basket, said form or block being fitted on a shaft or mandrel so that it may turn freely, and all so arranged that the splints may be interwoven together on the form or block with the greatest facility.

A represents a framing, constructed in any proper manner to support a horizontal shaft, B, which may be fixed or stationary, and C is a form or block, which may be of wood and in the shape corresponding to that of the baskets to be made. The shape in this instance is that of an ordinary half-bushel or bushel basket—those generally used as measures of capacity and known under that name. This form or block has a hole made centrally through it so that it may be fitted loosely on the shaft B, and allowed to turn freely thereon, and said form or block has a circular recess, $a$, made in its outer end to receive a bottom, $b$, in which the lower ends of the vertical splints $c$ of the baskets are fitted and secured in any proper manner. The splints $c$ are bent over the form or block, and are secured thereto at their outer ends by catches or buttons $d$, arranged in any proper way. The bottom $d$ may be made of a circular piece of board with a groove made in it all around its edge to receive the outer and converging ends of the splints $c$.

The operation is as follows: The operator first secures the bottom $b$ in the recess $a$, securing the same by a set-screw, $e$. He then inserts the outer ends of the splints $c$ in the groove in the bottom $b$, and may secure them therein by nails or tacks, if desired or necessary, and then bends the splints $c$ to the form or block C, and secures their outer ends to the form or block by the catches or buttons $d$. The filling-splints $e$ are then interwoven between the splints $c$, the form or block C being rotated on the shaft B, and the splints $c$ being temporarily released from the catches or buttons $d$, as may be required, to admit of the former being raised for the filling to be inserted or passed underneath them, each splint, after being raised and the filling passed underneath it, being again secured by its catch or button. The operation thus goes on until the basket is completed. The basket is then removed from the form or block and a hoop or rim secured in its upper end in the usual or in any proper manner.

We would remark that we do not confine ourselves to the catches or button $d$, as any other fastenings may be used.

The advantages to be derived from this invention consist, first, in the greater facility and celerity with which baskets can be made—about three times as many in a given time as can be made in the ordinary way; second, in the relief thereby afforded to the operator, who is enabled to stand or sit at work at will, instead of being compelled to assume the constrained and unhealthy posture that he now is; third, in the generally greater symmetry and correctness of shape of baskets thus made over those constructed in the usual way by the unassisted though practiced hand of the operator.

We claim as new and desire to secure by Letters Patent—

The form or block placed on a horizontal shaft so as to rotate freely, and provided with any suitable fastening or fastenings for securing the splints and bottom to the form or block, substantially as and for the purpose specified.

THOMAS CHURCHILL.
JEHIEL CHURCHILL.

Witnesses:
MATTHEW W. FORSTER,
A. M. FORSTER.